Patented Nov. 3, 1936

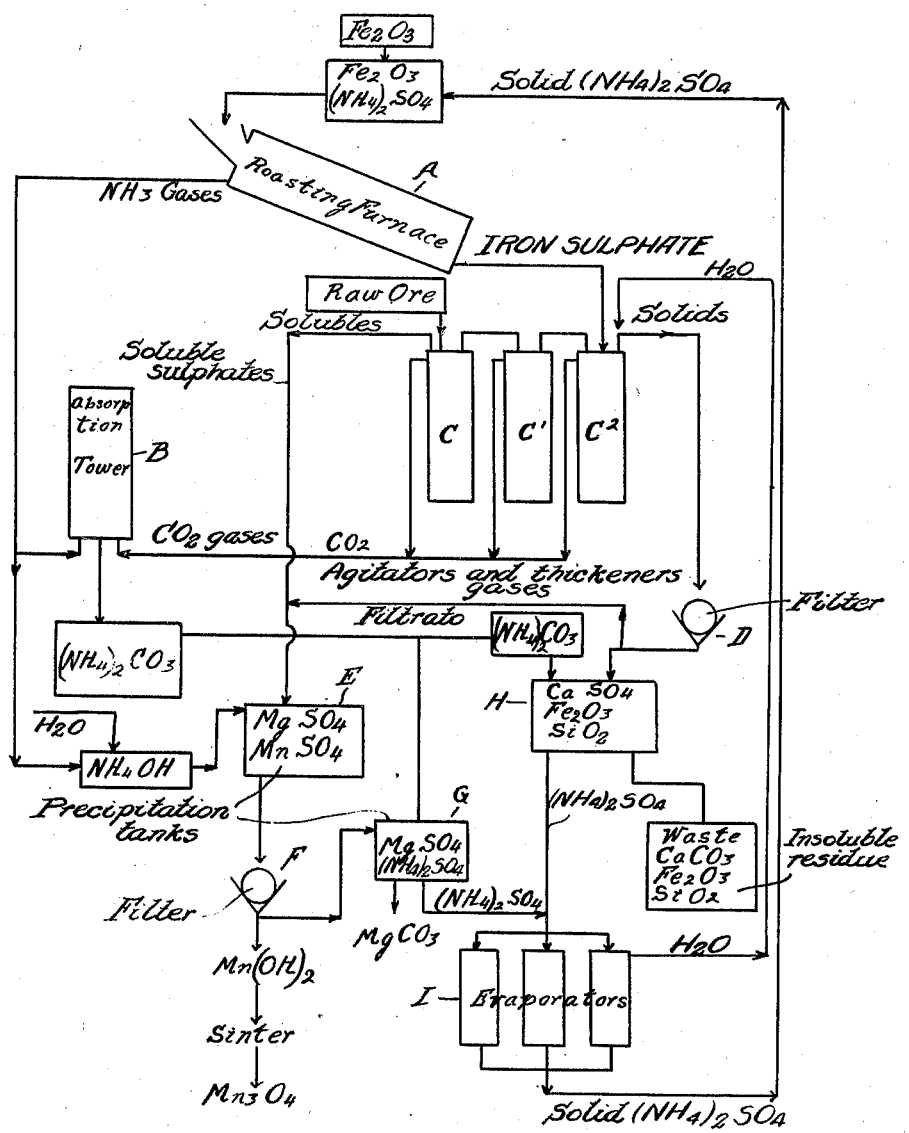

2,059,499

UNITED STATES PATENT OFFICE 2,059,499

PROCESS OF OBTAINING MANGANESE VALUES FROM ORES CONTAINING THEM

Andrew T. Sweet, Houghton, and John D. MacCarthy, Detroit, Mich., assignors to General Manganese Corporation, Detroit, Mich., a corporation of Delaware Application September 23, 1929, Serial No. 394,679
Renewed June 26, 1935

7 Claims. (Cl. 23—145)

The invention relates to the recovery of metal compounds from ores and more particularly to the extraction of compounds of metals such as manganese, magnesium and calcium from carbonate ores containing iron and insoluble compounds. While it is not necessary for the ore to contain an iron compound, one of the objects of the invention is to convert the desired metal or metals in the ore into soluble form while leaving the iron constituent in its insoluble state, thereby facilitating separation of the desired metal from the gangue by leaching. It is a further object to obtain the reagent for directly treating the ore by a preliminary step in the process and by the use of a primary reagent which if used directly on the ore might render the iron constituent when present soluble. Still further it is an object to obtain a cyclic process in which the primary reagent is recovered and may be used in repeating the cycle.

Many low grade ores contain valuable metals such as manganese associated with iron. It is possible to separate the manganese from the ore by first treating it with a reagent which will convert the manganese into a soluble salt, but most reagents used for this purpose will also render the iron soluble. Therefore while it is possible to separate the soluble constituents from the gangue, there remains the problem of separating the soluble manganese salt from the soluble iron salt. We have overcome this difficulty by using as a reagent for directly treating the raw ore an iron compound capable of reacting upon the manganese compound to render the latter soluble while leaving the iron in an insoluble state. A further feature of our invention is a process which has as the preliminary step the forming of this reagent with the iron base by the use of a primary reagent such as an ammonium salt which is subsequently recovered. This step is also useful in the manufacture of the iron salt for other uses than that of leaching the manganese or other metals from ores.

As shown by the flow sheet of the accompanying drawing, in carrying out our improved process we first treat iron oxide with a salt which when decomposed yields a gas, preferably an ammonium salt and preferably either ammonium sulphate or ammonium chloride. The treatment is preferably by roasting a moist mixture of iron oxide and the ammonium salt in a furnace A in which chemical reaction takes place converting the oxide into a salt such as a chloride or a sulphate. At the same time the gas formed such as the ammonia will be driven off and can be collected for use as a precipitant in a later step of the process.

The iron sulphate or chloride forming the product of this first step is then used for digesting a carbonate ore containing in addition to a manganese constituent compounds of other metals such as iron, calcium and magnesium and other metals common to the class. A specific example of such ore is one of the following analysis which represents the average analysis of an ore found in South Dakota:

|  | Per cent |
|---|---|
| Mn | 16.00 |
| Fe | 11.00 |
| P | .429 |
| Dried 212° F ---- SiO$_2$ | 13.00 |
| MgO | 1.80 |
| CaO | 15.00 |
| Al$_2$O$_3$ | 2.70 |
| CO$_2$ loss | 26.00 |

The crushed ore is digested with a hot water solution containing the iron sulphate or chloride which brings about a chemical reaction converting the manganese, magnesium and calcium constituents into chlorides or sulphates but leaving the iron constituent insoluble and precipitating the iron from the reagent resulting in the evolution of carbon dioxide gas which is commingled with some of the ammonia in the absorption tower B to form ammonium carbonate. This treatment of the ore is preferably carried on in a series of agitators and thickeners C, C', C$^2$ in which the flow of the ore and the solution is in reverse directions so that the nearly exhausted reagent comes in contact with the raw ore. Thus practically all of the iron chloride or sulphate salt will be precipitated in the form of iron hydroxide while the other metal compounds of manganese, magnesium and calcium, are converted into chlorides or sulphates as the case may be. The next step in the process is separating the soluble chlorides or sulphates from the insoluble residue. The insoluble residue contains normally all the iron constituent in the ore, the iron hydroxide formed during the digestion, insoluble compounds of the class consisting of silica, phosphates and alumina, and lastly when sulphates are used in the process insoluble calcium sulphate. This separation is made at thickener C and filter D. The soluble salts in solution pass to tank E and the insoluble residue to tank H when sulphates have been used in order that later the sulphate combined with the calcium may be recovered, otherwise the insoluble residue is disposed of immediately as waste.

After separating the soluble chlorides or sulphates from the gangue the solution is treated by precipitants derived from the ammonia which was displaced in the reaction forming the first step of the process. Thus the manganese may be first precipitated at E by the use of ammonium hydroxide and after separation at F from the solution of the remaining chlorides or sulphates, of the other metals are precipitated by treatment at G with ammonium carbonate. This results in the reformation of ammonium sulphate or chloride which was the original reagent used in the first step of the process and the cycle may then be repeated.

The gangue containing the calcium sulphate may be treated at H with some of the ammonium carbonate resulting in calcium carbonate and ammonium sulphate. The latter is mixed with the other ammonium sulphate and conducted to evaporators I from which the ammonium sulphate is returned to repeat the cycle.

While I have specifically described the process as it would function in the treatment of the specific carbonate ore cited for an example, it is obvious that the process can be used for the recovery of manganese compounds from other carbonate ores by making slight changes with or without the same or other similar associated minerals occurring in variable quantities as solubles or insolubles. It is also obvious that the soluble iron compound or salt so formed in the first step of the process may be used for other purposes than herein set forth.

What we claim as our invention is:

1. The process of recovering a manganese compound from carbonate ores having an iron constituent which consists in roasting iron oxide with ammonium sulphate to obtain soluble iron sulphate with the evolution of ammonia gas, collecting the gas, digesting the ore with a solution of said iron sulphate to convert the insoluble manganese compound into soluble manganese sulphate and to precipitate an iron compound from the iron sulphate, separating the soluble manganese sulphate from the insoluble residue, precipitating a manganese compound from the solution by ammonium hydroxide derived from the collected ammonia gas, thereby reforming the original ammonium sulphate and utilizing the latter to repeat the cycle.

2. The process of recovering a manganese compound from carbonate ores having an iron constituent which consists in roasting iron oxide with an ammonium salt of an inorganic acid which will form a soluble iron salt with the evolution of ammonia gas, collecting the gas, digesting the ore with a solution of said iron salt to convert the insoluble manganese compound into a soluble manganese salt and to precipitate an iron compound from the iron salt, separating the soluble manganese salt from the insoluble residue, precipitating a manganese compound from the solution by ammonium hydroxide derived from the collected ammonia gas thereby reforming the original ammonium salt and utilizing the latter to repeat the cycle.

3. The process of recovering manganese compounds from carbonate ores which comprises roasting an iron oxide with an ammonium salt capable of forming a soluble iron salt and resulting in the evolution of ammonia gas, digesting said carbonate ore with said iron salt to form a soluble manganese compound and to precipitate an insoluble iron compound resulting in the evolution of carbon dioxide gas, separating the soluble manganese compound from the insoluble residue, precipitating an insoluble manganese compound from the solution with an ammonium compound derived from at least one of said gases thereby reforming the original ammonium salt in solution and separating and evaporating the ammonium salt to the original state in order to repeat the cycle.

4. The process of recovering manganese compounds from carbonate ores which comprises roasting an iron oxide with ammonium sulphate forming soluble iron sulphate and resulting in the evolution of ammonia gas, digesting said carbonate ore with said iron sulphate to form soluble manganese sulphate and to precipitate an insoluble iron compound resulting in the evolution of carbon dioxide gas, separating the soluble manganese sulphate from the insoluble residue, precipitating an insoluble manganese compound from the solution with an ammonium compound derived from at least one of said gases thereby reforming ammonium sulphate in solution and separating and evaporating the ammonium sulphate to the original state in order to repeat the cycle.

5. The process of recovering manganese compounds from carbonate ores containing manganese, iron and insoluble compounds which comprises roasting an iron oxide with an ammonium salt capable of forming a soluble iron salt and resulting in the evolution of ammonia gas, digesting said carbonate ore with said iron salt to form a soluble manganese compound and to precipitate an insoluble iron compound resulting in the evolution of carbon dioxide gas, separating the soluble manganese compound from the insoluble residue, precipitating an insoluble manganese compound from the solution with an ammonium compound derived from at least one of said gases thereby reforming the original ammonium salt in solution and separating and evaporating the ammonium salt to the original state in order to repeat the cycle.

6. The process of recovering metal compounds from ores containing manganese and magnesium carbonates, iron and insoluble compounds which comprises roasting an iron oxide with ammonium sulphate to form soluble iron sulphate and resulting in the evolution of ammonia gas, digesting said ore with said iron sulphate to form soluble sulphates of manganese and magnesium thereby precipitating an insoluble iron compound and resulting in the evolution of carbon dioxide gas, separating the soluble sulphates of manganese and magnesium from the insoluble residue, precipitating from the solution manganese hydroxide with ammonium hydroxide derived from said ammonia gases thereby reforming ammonium sulphate, separating and treating the remaining solution with ammonium carbonate derived from said ammonia and carbon dioxide gases to precipitate magnesium carbonate and to reform the ammonium sulphate, and separating and evaporating the ammonium sulphate resulting from the several precipitations aforesaid to the original state in order to repeat the cycle.

7. The process of recovering metal compounds from ores containing manganese, magnesium and calcium carbonates, iron and insoluble compounds which comprises roasting an iron oxide with ammonium sulphate to form soluble iron sulphate and resulting in the evolution of ammonia gas, digesting said ore with said iron sulphate to form soluble sulphates of manganese and magnesium thereby precipitating an insoluble iron compound and resulting in the evolution of carbon dioxide gas, separating the manganese and magnesium sulphates from the insoluble residue, precipitating from the solution manganese hydroxide with ammonium hydroxide derived from said ammonia gas thereby reforming ammonium sulphate, separating and treating the remaining soluble sulphates of magnesium and ammonium with ammonium carbonate derived from said ammonia and carbon dioxide gases to precipitate insoluble magnesium carbonate and to reform the ammonium sulphate, treating the insoluble residue containing the calcium sulphate with ammonium carbonate derived from said ammonia and carbon dioxide gases to precipitate calcium carbonate and to reform ammonium sulphate, and separating and evaporating the ammonium sulphate resulting from the several precipitations to the original state in order to repeat the cycle.

ANDREW T. SWEET.
JOHN D. MacCARTHY.